United States Patent [19]
Kusaka et al.

[11] Patent Number: 5,452,021
[45] Date of Patent: Sep. 19, 1995

[54] IMAGE FLUCTUATION DETECTION APPARATUS

[75] Inventors: Hiroya Kusaka, Kawanishi; Takashi Sakaguchi, Kyoto, both of Japan

[73] Assignee: Matsushita Electric Industrial Co., Ltd., Osaka, Japan

[21] Appl. No.: 331,732

[22] Filed: Oct. 31, 1994

Related U.S. Application Data

[62] Division of Ser. No. 853,703, Jun. 8, 1992, Pat. No. 5,389,918.

[30] Foreign Application Priority Data

Oct. 23, 1990 [JP] Japan ............................. 2-286203
Nov. 28, 1990 [JP] Japan ............................. 2-331934

[51] Int. Cl.$^6$ ............................................. H04N 7/36
[52] U.S. Cl. ................................. 348/699; 348/208
[58] Field of Search ....................... 348/699, 208; H04N 7/137

[56] References Cited

U.S. PATENT DOCUMENTS

| 4,731,651 | 3/1988 | Matsumoto | 348/699 |
| 4,984,074 | 1/1991 | Uomori | 348/699 |

FOREIGN PATENT DOCUMENTS

| 55-39420 | 3/1980 | Japan . |
| 63-166369 | 7/1988 | Japan . |
| 279584 | 3/1990 | Japan . |

OTHER PUBLICATIONS

Uomori, et al, "Automatic Image Stabilizing System By Full-Digital Signal Processing," IEEE Transactions on Consumer Electronics, vol. 36, No. 3, pp. 510–519, Aug. 1990.

Kai, et al, "The Electronic Picture Stabilizer," ITEJ Technical Report, vol. 11, No. 3, pp. 43–48, May 1987.

*Primary Examiner*—Howard W. Britton
*Attorney, Agent, or Firm*—Stevens, Davis, Miller & Mosher

[57] ABSTRACT

When an image motion vector is to be detected, correlation calculations are performed by a correlation calculation circuit (12) and the motion vector is detected from the result. At this time, the video signal undergoing correlation calculations has a half-line deviation between the fields in the vertical direction caused by interlace. Then, the detected motion vector contains an error of half a line derived from the above deviation. Therefore, a motion vector correction circuit (14) corrects the error by adding to or subtracting from the motion vector derived by the motion vector detection circuit (13) a predetermined number corresponding to half a line. Further, a vertical-direction interpolation circuit (31) is provided to produce a vertical-direction interpolation signal for a video signal. One of video signals performed with correlation calculations in a correlation calculation circuit (33) is always the video signals interpolated in the vertical direction. Thereby the above described error is corrected.

6 Claims, 5 Drawing Sheets

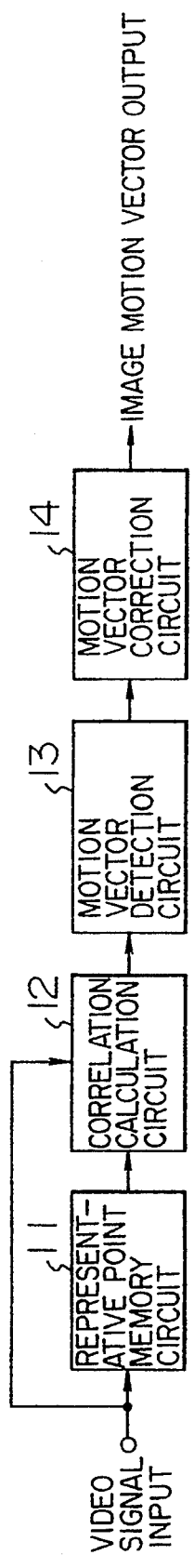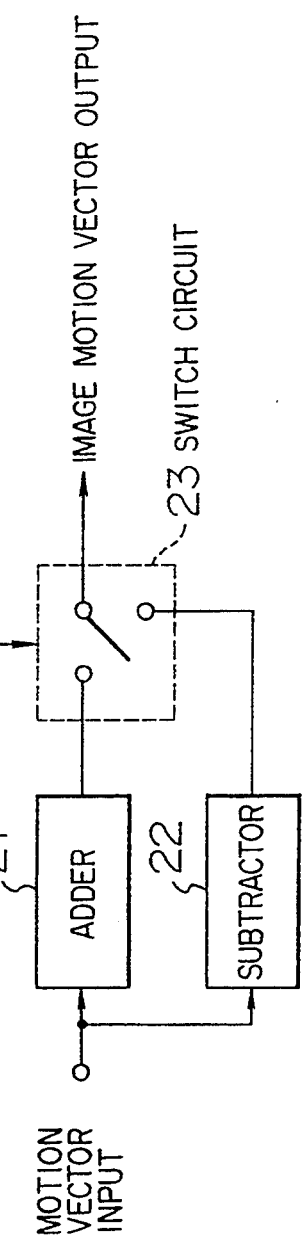

IMAGE FLUCTUATION DETECTION APPARATUS

This is a division of application Ser. No. 07/853,703 filed Jun. 8, 1992, now U.S. Pat. No. 5,389,918.

TECHNICAL FIELD

The present invention relates to an image fluctuation detection apparatus used for correction of hand vibration of video cameras, for example.

BACKGROUND ART

When a subject is shot by a video camera, holding of the video camera directly by a person with their hands or mounting of the video camera on a moving body, such as a vehicle, causes fluctuation at the time of shooting to appear on the screen. Therefore, a hand-vibration correction apparatus has been put into practical use, in which an image fluctuation is detected from a video signal and position corrections of the image are made on the basis of this fluctuation information. Such a hand-vibration correction apparatus needs an image fluctuation detection apparatus for detecting the fluctuation of the image.

As a representative example thereof, a method of detecting an image fluctuation from an image signal after shooting, performing image position corrections on the basis of the fluctuation information, and thereby removing the fluctuation will first be described (Technical Report, The Institute of Television Engineers of Japan, vol. 11, no. 3, May 1987).

An image signal having an image fluctuation first undergoes A/D conversion and is distributed to two systems. The signal supplied to one of the two systems is transferred to a Y/C separation circuit. Only a Y signal is taken out therein and transferred to a motion vector detection circuit. In the motion vector detection circuit, an operation resulting in generation of an optimum correction vector is performed while undergoing control concerning the detection area.

On the other hand, the signal supplied from the A/D conversion circuit to the other of the two systems is transferred to a delay circuit and delayed therein by a time required for the motion vector detection circuit to detect the motion vector and generate a correction vector. Thereafter, it is written into a memory and then undergoes processing such as control over the read address, image expansion and interpolation. The signal thus processed is transferred to a D/A conversion circuit to become an output signal.

A method of detecting an image fluctuation from an image signal during shooting, performing image position corrections on the basis of the fluctuation information, and thereby removing the fluctuation will now be described (IEEE Transactions on Consumer Electronics, vol. 36, no. 3, Aug. 1990).

An video signal having an image fluctuation first undergoes A/D conversion and is distributed to two systems. The signal supplied to one of the two systems is transferred to a motion vector detection circuit. Only a required signal component is taken out by a filter circuit and an optimum correction vector is generated.

On the other hand, the signal supplied from the A/D conversion circuit to the other of the two systems is written into a memory and then undergoes processing such as control over the read address, image expansion and interpolation according to the correction vector. The signal thus processed is transferred to a D/A conversion circuit to become an output signal.

In the above described configuration, however, consideration is not given to discrepancy of a half line in vertical direction caused by interlace between fields of a video signal. Therefore, the above described configuration has a problem that this error of a half line in vertical direction is included in the correction vector for correcting the image fluctuation.

The present invention aims to solve such a problem of the prior art. A technical subject of the present invention is to improve the precision of image fluctuation detection in vertical direction.

DISCLOSURE OF INVENTION

In order to solve this problem, the present invention provides an image fluctuation detection apparatus for a video signal of an interlace system including a representative point memory circuit for dividing the video signal of a current field into a plurality of areas, storing signals corresponding to representative points of the respective areas as representative point signals, and outputting respective representative point signals of the last field, a correlation calculation circuit for performing correlation calculations between respective representative point signals supplied from the above described representative point memory circuit and the input video signal within the respective areas corresponding to the representative point signals, a motion vector detection circuit for detecting an inter-field image motion vector, representing movement of an image between fields, from a calculation result supplied from the above described correlation calculation circuit, and a motion vector correction circuit for correcting the inter-field image motion vector supplied from the above described motion vector detection circuit.

Further, the present invention provides an image motion detection apparatus for an input video signal of an interlace system including a vertical-direction interpolation circuit for performing interpolation processing between lines on the input video signal, producing an interpolation signal and outputting the interpolation signal as a vertical-direction interpolation video signal, a representative point memory circuit for dividing the above described vertical-direction interpolation video signal or the above described input video signal into a plurality of areas, storing signals corresponding to representative points of respective areas as representative point signals, and outputting respective representative point signals of the last field, a correlation calculation circuit for performing correlation calculations between respective representative point signals supplied from the above described representative point memory circuit and the above described vertical-direction interpolation video signal or the above described input video signal within the respective areas corresponding to the representative point signals, and a motion vector detection circuit for detecting an inter-field image motion vector from a calculation result supplied from the above described correlation calculation circuit and a motion vector correction circuit for performing a vector correction on the inter-field image motion vectors by adding or subtracting a scanning position displacement value in the vertical direction between the current field and the last field to/from a vertical-direction component of the detected inter-field image motion vector supplied from the motion vector detection circuit.

Owing to this configuration, it becomes possible to correct an error included in the detected value of the inter-field image motion vector resulting from displacement of pixels caused in the vertical direction by interlace between successive fields of a video signal.

BRIEF DESCRIPTION OF DRAWINGS

FIG. 1 is a block diagram of an image fluctuation detection apparatus in a first embodiment of the present invention;

FIG. 2 is a block diagram showing the internal configuration of the motion vector correction circuit illustrated in FIG. 1;

BEST MODE FOR CARRYING OUT THE INVENTION

Figure 3:
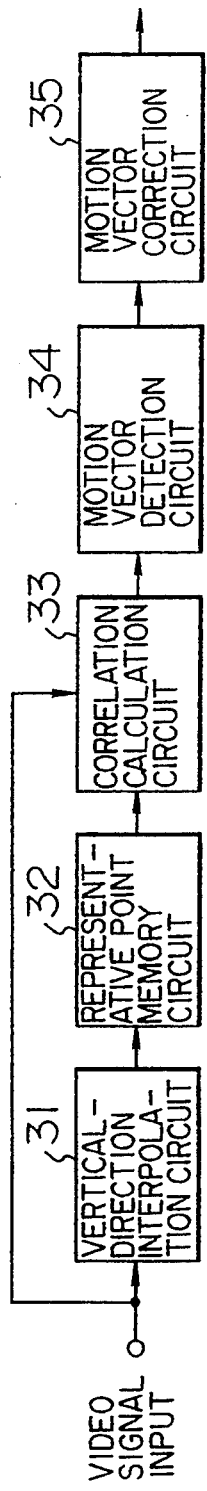
FIG. 3 is a block diagram showing the configuration of an image fluctuation detection apparatus in a second embodiment of the present invention.

A first embodiment of the present invention will hereafter be described by referring to the drawings.

FIG. 1 shows a block diagram of an image fluctuation detection apparatus in the first embodiment of the present invention. In FIG. 1, numeral 11 denotes a representative point memory circuit for dividing an input video signal of a current field of an interlace system into a plurality of areas, storing signals corresponding to representative points of respective areas as representative point signals, and outputting respective representative point signals of the last field. Numeral 12 denotes a correlation calculation circuit for performing correlation calculations between respective representative point signals and the input video signal within respective areas. Numeral 13 denotes a motion vector detection circuit for detecting an inter-field image motion vector from a calculation result supplied from the correlation calculation circuit 12. Numeral 14 denotes a motion vector correction circuit for correcting the inter-field image motion vector supplied from the motion vector detection circuit 13.

FIG. 2 is a detailed diagram of a motion vector correction circuit 14 shown in FIG. 1. In FIG. 2, numeral 21 denotes an adder for adding a predetermined number to its input, and numeral 22 denotes a subtractor for subtracting a predetermined number from its input. Numeral 23 denotes a switch circuit controlled by field informat.

Operation of the image fluctuation detection apparatus of the present embodiment configured as heretofore described will hereafter be described.

The representative point memory circuit 11 divides an input video signal of current field into a plurality of areas and stores signals corresponding to representative points of respective areas as representative point signals.

Figure 8:
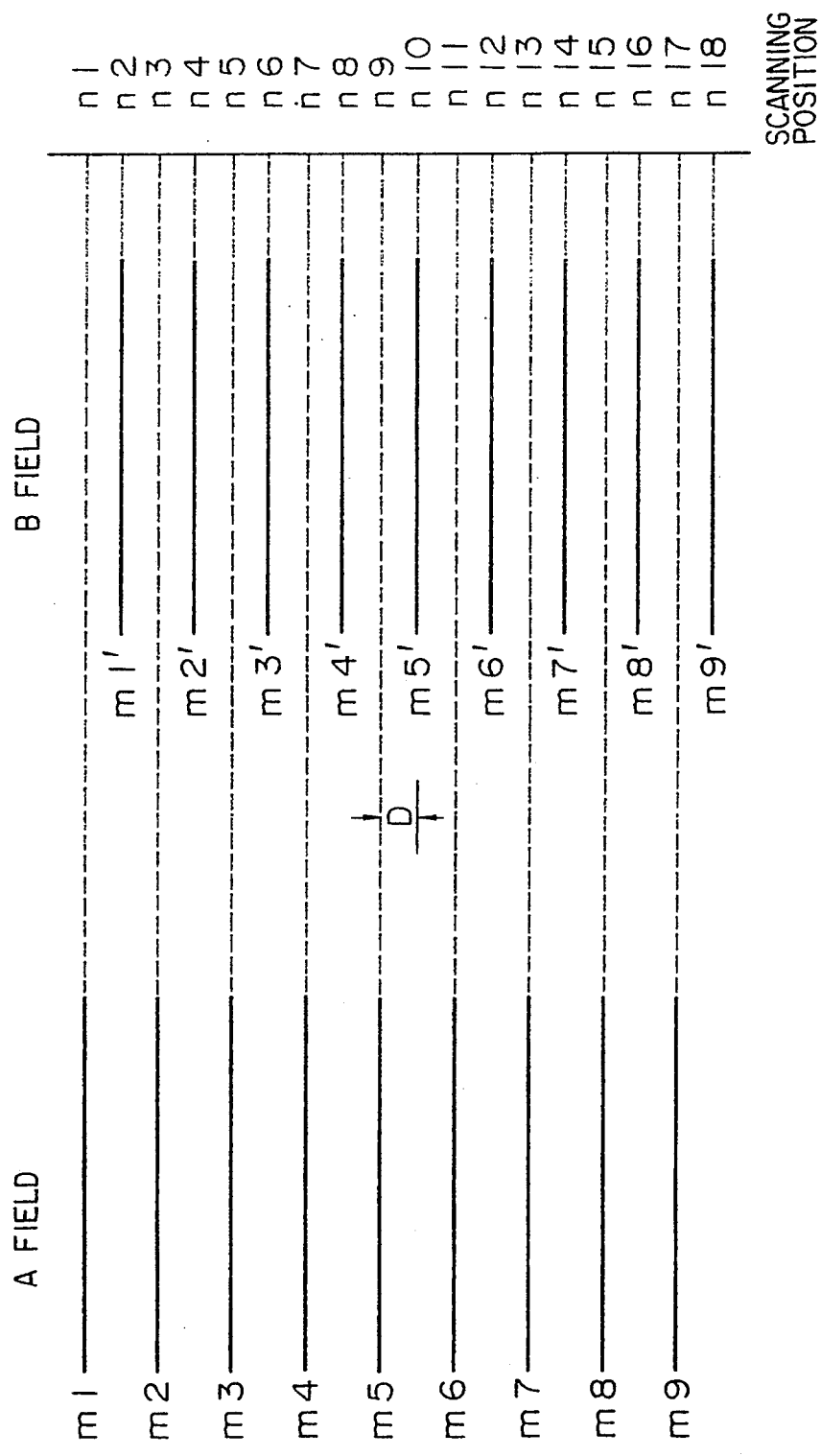
FIG. 8 is a diagram to be used for explaining a video signal of an interlace system.

At that time, the representative point memory circuit 11 outputs respective representative point signals stored in the last field to the correlation calculation circuit 12. The correlation calculation circuit 12 performs correlation calculations between respective representative point signals of the last field outputted from the representative point memory circuit 11 and the input video signal within the respective areas of the current field corresponding thereto. Here, however, consideration is not given to the pixel displacement in vertical direction caused between fields by interlace. On the basis of a result of the calculation supplied from the correlation calculation circuit 12, the motion vector detection circuit 13 detects an inter-field image motion vector. The inter-field image motion vector provided by the motion vector detection circuit 13 contains a detection error in the vertical direction caused by interlace because the inter-field image motion vector is detected without taking pixel displacement in the vertical direction, caused between fields by interlace, into consideration. In order to correct this error, the motion vector correction circuit 14 substracts or adds a predetermined number depending on whether the current field is an even-numbered field or an odd-numbered field. The predetermined number to be subtracted or added is a value D shown in FIG. 8 (which is half of the line spacing in the present embodiment). The method of subtraction and addition used here will now be described by referring to FIG. 8. In case the field of the current input video signal is an A field, the signals undergoing the correlation calculations in the correlation calculation circuit 12 become the input video signal of an A field and representative point signals derived from the input video signal of a B field preceding the A field by one field, and hence a value corresponding to D of FIG. 8, is subtracted from the inter-field image motion vector detected by the motion vector detection circuit 13. That is to say, the switch circuit 23 is so set as to select the output of the subtractor 22. If on the contrary the current field is a B field, a value corresponding to D of FIG. 8 is added to the inter-field image motion vector detected by the motion vector detection circuit 13. That is to say, the switch circuit 23 is so set as to select the output of the adder 21. The inter-field image motion vector corrected by this subtraction or addition is outputted as a final inter-field image motion vector.

In accordance with the present embodiment, the inter-field image motion vector detected by the motion vector detection circuit 13 is corrected by the motion vector correction circuit 14 as heretofore described. Thereby the error in vertical direction of the image motion vector obtained by correlation calculation between the successive fields, which has been inevitable by all means when the conventional method is used, can be reduced.

As for the operation of the motion vector detection circuit 13, there has been devised a method whereby image motion vector information pieces obtained in respective areas wherein correlation calculations are made are so sorted that vector information pieces of each of resultant groups may indicate the same direction, and the direction and magnitude indicated by the most numerous vector information pieces are defined as the image motion vector for the entire screen. However, the operation of the motion vector detection circuit 13 is not especially limited to this method.

In FIG. 2, the configuration of the motion vector correction circuit 14 is so represented that it may be divided into three parts, i.e. the adder 21, the subtractor 22 and the switch circuit 23. However, the configuration of the motion vector correction circuit 14 is not limited to the above configuration.

Further, hand-vibration corrector of video cameras has been mentioned as the industrial field of utilization. However, the field is not limited to this, but a similar effect can also be obtained in case of adaptive aperture correction and adaptive noise reduction using the image motion vector, for example.

A second embodiment of the present invention will now be described by referring to the drawings.

FIG. 3 shows a block diagram of an image fluctuation detection apparatus in a second embodiment of the present invention. In FIG. 3, numeral 31 denotes a vertical-direction interpolation circuit for performing interpolation processing between lines on an input video signal of the current an interlace system and outputting a resultant interpolation signal as a vertical-direction interpolation video signal. Numeral 32 denotes a representative point memory circuit for dividing the vertical-direction interpolation video signal outputted from the vertical-direction interpolation circuit 31 into a plurality of areas, storing signals corresponding to representative points of respective areas as representative point signals, and outputting at this time respective representative point signals stored in the last field to the correlation calculation circuit 33. Numeral 33 denotes a correlation calculation circuit for performing correlation calculations between respective representative point signals supplied from the representative point memory circuit 32 and the input video signal within the respective areas corresponding to the representative point signals. Numeral 34 denotes a motion vector detection circuit for detecting an inter-field image motion vector from a calculation result supplied from the correlation calculation circuit 33. Numeral 35 denotes a motion vector correction circuit for correcting the inter-field image motion vector supplied from the motion vector detection circuit 34.

Operation of an image fluctuation detection apparatus of the present embodiment configured as heretofore described will hereafter be described. The vertical-direction interpolation circuit 31 performs interpolation processing between lines on an input video signal of the current field and outputs a resultant signal as a vertical-direction interpolation video signal. The representative point memory circuit 32 divides the vertical-direction interpolation video signal outputted from the vertical-direction interpolation circuit 31 into a plurality of areas and stores signals corresponding to representative points of respective areas. At this time, the representative point memory circuit 32 outputs respective representative point signals stored in the last field to the correlation calculation circuit 33. The correlation calculation circuit 33 performs correlation calculations between respective representative point signals of the last field supplied from the representative point memory circuit 32 and the input video signal within the respective areas of the current field. The motion vector detection circuit 34 detects an inter-field image motion vector from a calculation result supplied from the correlation calculation circuit 33. Finally, the motion vector correction circuit 35 corrects the inter-field image motion vector detected by the motion vector detection circuit 34. The correction made by this motion vector correction circuit 35 will now be described by referring to FIG. 8. In case an interpolation signal is to be produced in the A field shown in FIG. 8, for example, the interpolation signal is to be produced from m1 and m2, the vertical-direction scanning position of the B field corresponding to this interpolation signal is n2, which becomes the same scanning position as m1 of the B field. When correlation calculations are performed between representative points of the A field and the video signal of the B field to detect a motion vector, a correction of the detected inter-field image motion vector is not required. In case on the contrary an interpolation signal is to be produced in the B field, for example, the interpolation signal is to be produced from m1' and m2', the vertical-direction scanning position of the A field corresponding to this interpolation signal is n3, which becomes the same scanning position as m2 of the A field. When correlation calculations are performed between representative points of the B field and the video signal of the A field to detect a motion vector, the detected inter-field image motion vector needs a correction in vertical direction equivalent to one line. This correction is made by the motion vector correction circuit 35.

In accordance with the present embodiment as heretofore described, it is possible to cancel the position displacement of pixels in the vertical direction between fields of a video signal of interlace system to align pixels in consecutive fields by using the vertical-direction interpolation circuit 31. As a result, the detected error of the inter-field image motion vector due to displacement of pixels in vertical direction caused between fields by interlace can be reduced and the detection precision of the inter-field image motion vector can be improved.

Figure 4:
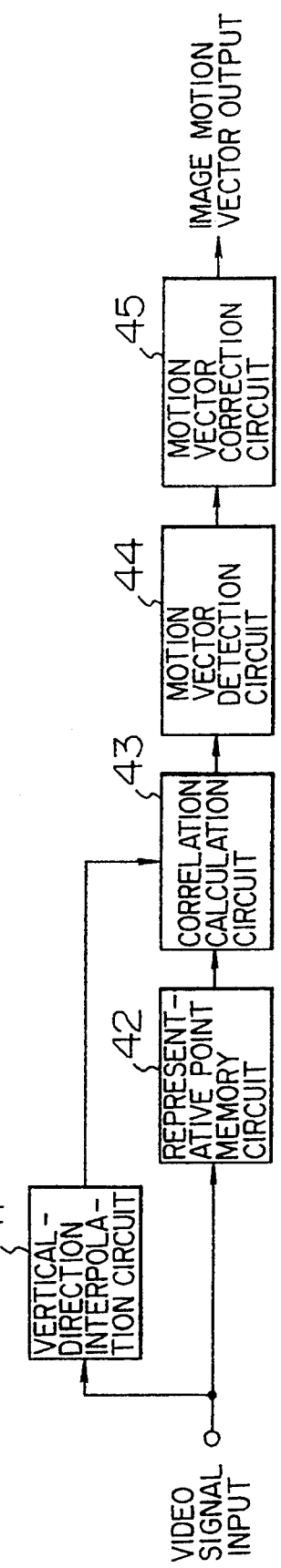
FIG. 4 is a block diagram showing the configuration of an image fluctuation detection apparatus in a third embodiment of the present invention.

FIG. 4 shows a block diagram of an image motion detection apparatus in a third embodiment of the present invention. In FIG. 4, circuits 41–45 have the same names and functions as the circuits 31–35 of the second embodiment have.

Its operation will hereafter be described.

A vertical-direction interpolation circuit 41 performs interpolation processing to produce an interpolation signal between lines on an input video signal of the current field, and outputs the interpolation signal as a vertical-direction interpolation video signal. A representative point memory circuit 42 divides the input video signal into a plurality of areas and stores signals corresponding to representative points of respective areas. At this time, the representative point memory circuit 42 outputs respective representative point signals stored in the last field to the correlation calculation circuit 43. The correlation calculation circuit 43 performs correlation calculations between respective representative point signals of the last field supplied from the representative point memory circuit 42 and the video signal within the respective areas outputted from the vertical-direction interpolation circuit 41. Since processing performed in a motion vector detection circuit 44 and a motion vector correction circuit 45 is identical with that of the above described second embodiment, its description will be omitted.

In the same way as the second embodiment, the present embodiment configured as heretofore described also brings about effects of reducing the error of the detected image motion vector due to discrepancy of pixels in vertical direction caused between fields by interlace and improving the detection precision of the image motion vector.

Figure 5:
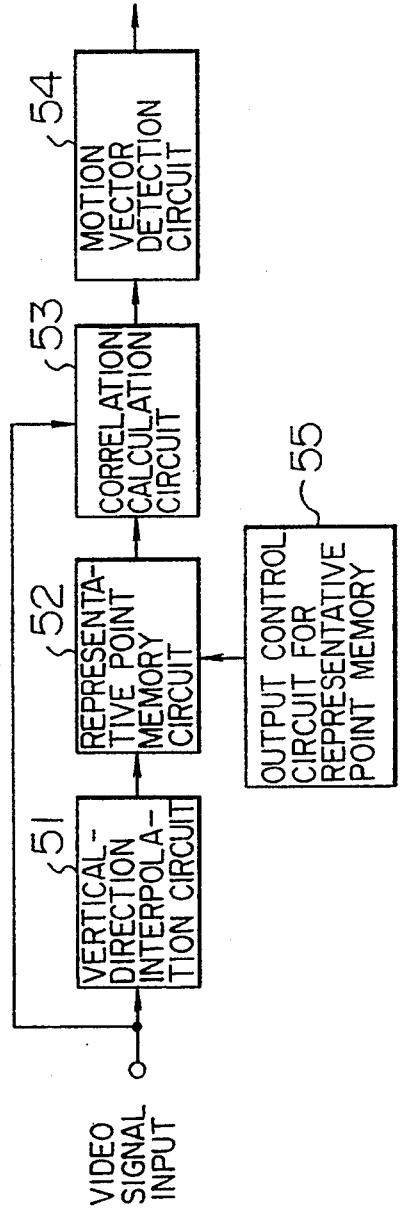
FIG. 5 is a block diagram showing the configuration of an image fluctuation detection apparatus in a fourth embodiment of the present invention.

FIG. 5 shows a block diagram of an image motion detection apparatus in a fourth embodiment of the present invention. In FIG. 5, numeral 51 denotes a vertical-direction interpolation circuit for performing interpolation processing between lines on an input video signal of the current field of an interlace system and outputting a resultant interpolation signal as a vertical-direction interpolation video signal. Numeral 52 denotes a representative point memory circuit for dividing the vertical-direction interpolation video signal outputted from the vertical-direction interpolation circuit 51 into a plurality of areas, storing signals corresponding to representative points of respective areas as representative point signals, and outputting at this time respective representative point signals stored in processing for the last field to the correlation calculation circuit 53. Numeral 53 denotes a correlation calculation circuit for performing correlation calculations between respective representative point signals supplied from the representative point memory circuit 52 and the input video signal within the respective areas corresponding to the representative point signals. Numeral 54 denotes a motion vector date on circuit for detecting an inter-field image motion vector from a calculation result supplied from the correlation calculation circuit 53. Numeral 55 denotes a representative point memory output control circuit for controlling the representative point memory circuit 52 on the basis of field information and changing positional relations between representative points and the video signal within the respective areas corresponding thereto.

Operation of an image motion detection apparatus of the present embodiment configured as heretofore described will hereafter be described.

The vertical-direction interpolation circuit 51 performs interpolation processing between lines on an input video signal of the current field to produce an interpolation signal, and outputs the interpolation signal as a vertical-direction interpolation video signal. The representative point memory circuit 52 divides the vertical-direction interpolation video signal outputted from the vertical-direction interpolation circuit 51 into a plurality of areas and stores signals corresponding to representative points of respective areas. At this time, the representative point memory circuit 52 outputs respective representative point signals stored in processing for the last field to the correlation calculation circuit 53 under the control of the representative point memory output control circuit 55. Operation of this representative point memory output control circuit 55 will now be described. In the image fluctuation detection apparatus configured as shown in FIG. 3, a correction equivalent to one line was made by the motion vector correction circuit 35 for the purpose of interpolation processing of the video signal as described before with reference to the second embodiment. In the present embodiment, however, this correction is made unnecessary by addition of the representative point memory output control circuit 55. The correction made by the representative point memory output control circuit 55 will now be described by referring to FIG. 8. In case an interpolation signal is to be produced in the A field as shown in FIG. 8, for example, the interpolation signal is to be produced from m1 and m2, the vertical-direction scanning position of the B field corresponding to this interpolation signal is n2, which becomes the same scanning position as m1' of the B field. When correlation calculations are performed between representative points of the A field and the video signal of the B field to detect a motion vector, a correction of the detected inter-field image motion vector is not required. In case on the contrary an interpolation signal is to be produced in the B field, for example, the interpolation signal is to be produced from m1' and m2', the scanning position of the A field corresponding to this interpolation signal is n3, which becomes the same scanning position as m2 of the A field, resulting in discrepancy equivalent to one line. When correlation calculations are performed between representative points of the B field and the video signal of the A field, the output timing of representative point signals from the representative point memory circuit 52 is so controlled by the representative point memory output control circuit 55 that the start line of correlation calculations of the A field may not be m1 but may be m2 in order to cancel the discrepancy. Thereby the motion vector correction circuit 35 for making a correction equivalent to one line on the detected motion vector which is needed in the second embodiment becomes unnecessary.

In accordance with the present embodiment as heretofore described, it is possible to cancel the position displacement of pixels in the vertical direction between fields of a video signal of an interlace system to align pixels in consecutive fields by using the vertical-direction interpolation circuit 51 and the representative point memory output control circuit 55. Further, without using the motion vector correction circuit, the detected error of the inter-field image motion vector due to discrepancy of pixels in vertical direction caused between fields by interlace can be reduced and the detection precision of the image motion vector can be improved.

The fourth embodiment has been described on the basis of the configuration of the second embodiment. It is evident that similar effects can be obtained on the basis of the third embodiment as well.

Figure 6:
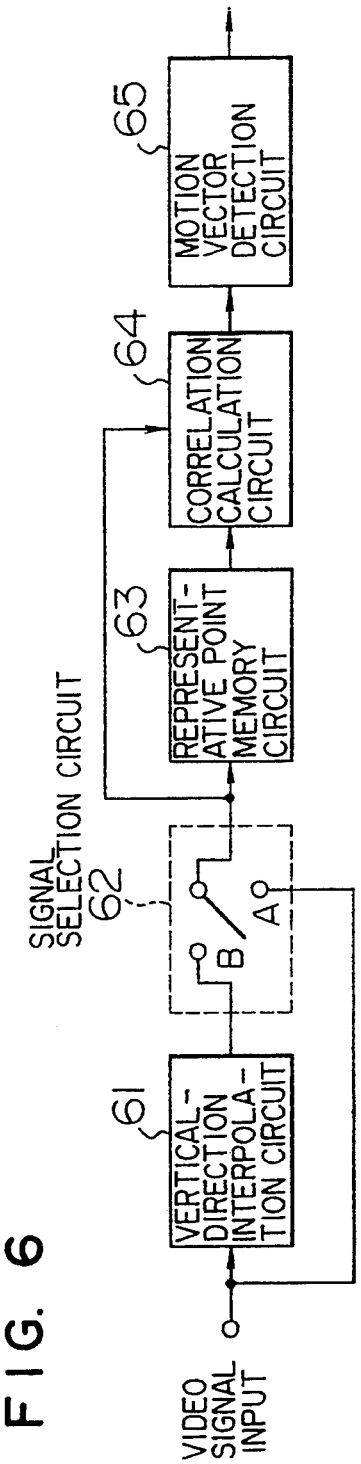
FIG. 6 is a block diagram showing the configuration of an image fluctuation detection apparatus in a fifth embodiment of the present invention.

FIG. 6 shows a block diagram of an image motion detection apparatus in a fifth embodiment of the present invention. In FIG. 6, numeral 61 denotes a vertical-direction interpolation circuit for performing interpolation processing between lines on an input video signal of the current field, producing an interpolation signal and outputting the interpolation signal as a vertical-direction interpolation video signal. Numeral 62 denotes a signal selection circuit responsive to field information to select either the vertical-direction interpolation video signal outputted from the vertical-direction interpolation circuit 61 or the input video signal which has not undergone interpolation processing in the vertical-direction interpolation circuit 61 as a video signal to be transferred to the succeeding circuit system. Numeral 63 denotes a representative point memory circuit for dividing the video signal outputted from the signal selection circuit 62 into a plurality of areas, storing signals corresponding to representative points of respective areas, and outputting at this time respective representative point signals stored in processing for the last field. Numeral 64 denotes a correlation calculation circuit for performing correlation calculations between respective representative point signals of the last field supplied from the representative point memory circuit 63 and the video signal within the respective areas outputted from the signal selection circuit 62. Numeral 65 denotes a motion vector detection circuit for detecting an inter-field image motion vector from a calculation result supplied from the correlation calculation circuit 64.

Its operation will hereafter be described while laying stress on points of difference from that of the second, third and fourth embodiments.

The vertical-direction interpolation circuit 61 performs interpolation processing between lines on an input video signal of the current field to produce an interpolation signal, and outputs the interpolation signal as a vertical-direction interpolation video signal. In response to field information, the signal selection circuit 62 selects either the vertical-direction interpolation video signal outputted from the vertical-direction interpolation circuit 61 or the input video signal. The representative point memory circuit 63 divides the video signal outputted from the signal selection circuit 62 into a plurality of areas and stores signals corresponding to representative points of respective areas. At this time, the representative point memory circuit 63 outputs respective representative point signals stored in the last field to the correlation calculation circuit 64. The correlation calculation circuit 64 performs correlation calculations between respective representative point signals of the last field supplied from the representative point memory circuit 63 and the video signal within the respective areas outputted from the signal selection circuit 62. The motion vector detection circuit 65 detects an inter-field image motion vector from a calculation result supplied from the correlation calculation circuit 64.

In the present embodiment, the motion vector correction circuits 35 and 45 needed respectively in the above described second and third embodiments as well as the representative point memory output control circuit 55 needed in the fourth embodiment become unnecessary. The reason will now be described by referring to FIG. 8. Assuming now that the field of the current input video signal is the A field and the signal selection circuit 62 selects the video signal which has undergone interpolation processing and which is supplied from the vertical-direction interpolation circuit 61, the output signal of the signal selection circuit 62 in the last field is the signal which has not undergone vertical-direction interpolation processing. In spite of field difference, therefore, respective representative point signals produced from the video signal of the last field and the video signal of the current field, which are to undergo correlation calculation in the correlation calculation circuit 64, have no position discrepancy of pixels in the vertical direction. Assuming then in the same way that the current field of the input video signal is the B field and the signal selection circuit 62 selects the video signal which has not passed through the vertical-direction interpolation circuit 61, the output signal of the signal selection circuit 62 in the last field is the signal which has undergone vertical-direction interpolation processing. In spite of field difference, therefore, respective representative point signals produced from the video signal of the last field and the video signal of the current field, which are to undergo correlation calculation in the correlation calculation circuit 64, also have no position discrepancy of pixels in the vertical direction.

In accordance with the present embodiment as heretofore described, it is possible to cancel the position displacement of pixels in the vertical direction between fields of a video signal of interlace system to align pixels in consecutive fields by using the vertical-direction interpolation circuit 61 and the signal selection circuit 62. Further, without using the motion vector correction circuits 35 and 45 respectively needed in the second and third embodiments, the detected error of the image motion vector due to displacement of pixels in vertical direction caused between fields by interlace can be reduced and the detection precision of the inter-field image motion vector can be improved. Further, the representative point memory output control circuit 55 needed in the fourth embodiment also becomes unnecessary.

Figure 7:
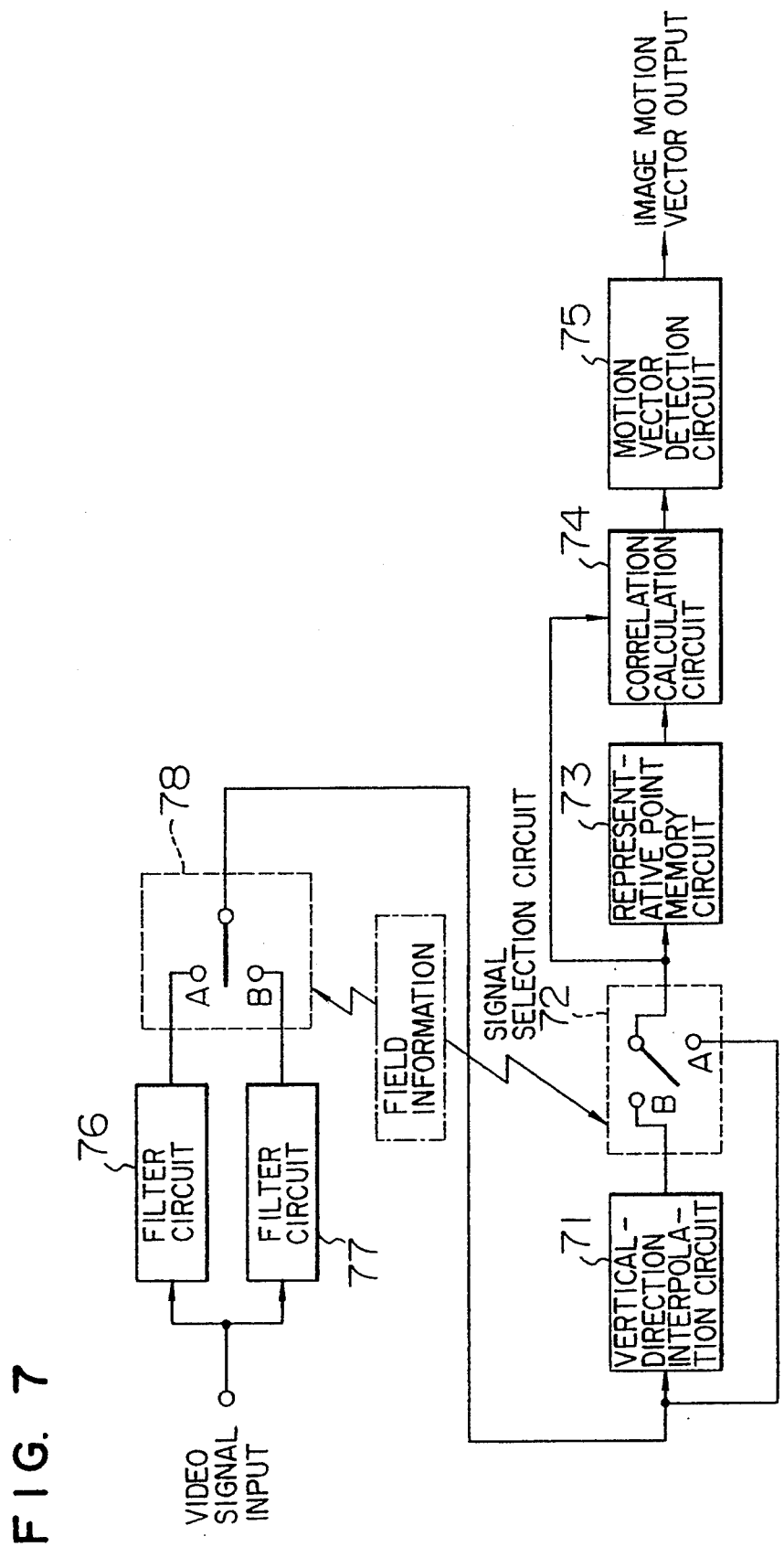
FIG. 7 is a block diagram showing the configuration of an image fluctuation detection apparatus in a sixth embodiment of the present invention.

FIG. 7 shows a block diagram of an image fluctuation detection apparatus in a sixth embodiment of the present invention. In FIG. 7, circuits 71–75 have the same names and functions as the circuits 61–65 of the above described fifth embodiment have. Numerals 76 and 77 denote filter circuits for extracting a feature of the image from the video signal. Numeral 78 denotes a filter selection circuit responsive to field information to switch inputs from the filter circuits 76 and 77.

Its operation will hereafter be described while laying stress on points of difference from that of the fifth embodiment.

In case a vertical-direction interpolation circuit for performing interpolation processing on a video signal as in the above described second to fifth embodiment is added to an image fluctuation detection apparatus having a filter circuit for extracting a feature from the input video signal, this interpolation processing functions as a kind of low-pass filter and hence overall filtering effect of the entire image fluctuation detection apparatus upon the video signal differs from that of the conventional case without interpolation processing, resulting in degraded filtering effect. In order to correct this degradation of the filtering effect, filter circuits 76 and 77 as well as the filter selection circuit 78 are provided. These circuits correct degradation of the overall filtering effect of the case where the interpolation calculation processing is conducted. The filter selection circuit 78 are interlocked with the signal selection circuit 72. When the signal selection circuit 72 selects a video signal which has not passed through the vertical-direction interpolation circuit 71, the filter selection circuit 78 selects the filter circuit 76. On the contrary, when the signal selection circuit 72 selects a video signal which has passed through the vertical-direction interpolation circuit 71, the filter selection circuit 78 selects the filter circuit 77. Thereby overall filter characteristics with respect to the video signal transferred to the circuit system including the representative point memory circuit 73 and succeeding circuits can be made equal and an optimum effect can be obtained. (That is to say, filter characteristics can be represented as [characteristics of the filter circuit 76]=[characteristics of the filter circuit 77]+[characteristics of the vertical-direction interpolation circuit 71].) Remaining processing performed in the vertical-direction interpolation circuit 71, signal selection circuit 72, representative point memory circuit 73, correlation calculation circuit 74 and motion vector detection circuit 75 is similar to that of the above described fifth embodiment and its description will be omitted.

Even if the vertical-direction interpolation circuit for correcting an error of the inter-field image motion vector due to pixel displacement in vertical direction caused between fields of a video signal by interlace is added to the image fluctuation detection apparatus including a filter circuit having certain optimum characteristics for detecting an inter-field image motion vector more accurately, a circuit configuration exhibiting filtering effects of optimum characteristics in both fields can be implemented in the present embodiment heretofore described by newly providing a different filter circuit.

The filter circuit 76 and the filter circuit 77 have been described as two separate circuits. However, it is evident that they need not be separate, but they may be constituted with one common circuit sharing a part which can be shared.

Further, the filter selection circuit 78 has been described as one independent circuit. However, it is evident that the filter selection circuit 78 need not be independent, but the filter selection circuit 78 may be incorporated into the filter circuits 76 and 77.

Further, in the present embodiment, the filter circuits are disposed in the foregoing stage of the image motion detection circuit. However, disposition of the filter circuits is not limited to this. In an alternative configuration, for example, the filter circuit 77 is disposed between the vertical-direction interpolation circuit 71 and the signal selection circuit 72 and the filter circuit 76 is disposed in a route through which the input video signal arrives at the signal selection circuit 72 without passing through the vertical-direction interpolation circuit 71. In this case, a circuit can be used in common as the filter selection circuit 78 and the signal selection circuit 72.

The present embodiment shows an example of configuration in which filter circuits are added to the fifth embodiment. However, it is evident that addition of filter circuits as in the present embodiment is useful for the above described second, third and fourth embodiments as well.

As for the operation of the motion vector detection circuit used in the above described second to sixth embodiments, there has been devised a method whereby image motion vector information pieces obtained in respective areas wherein correlation calculations are made are so sorted that vector information pieces of each of resultant groups may indicate the same direction, and the direction and magnitude indicated by the most numerous vector information pieces are defined as the image motion vector for the entire screen. However, the operation of the motion vector detection circuit is not especially limited to this.

Further, hand-vibration correction of video cameras has been mentioned as the industrial field of utilization. However, the field is not limited to this, but a similar effect can also be obtained in case of adaptive aperture correction and adaptive noise reduction using the inter-field image motion vector, for example.

INDUSTRIAL APPLICABILITY

When an inter-field image motion vector is detected from a video signal of an interlace system, the detected error of the image motion vector caused by all means by pixel displacement in vertical direction between fields due to interlace is corrected by the motion vector correction circuit in accordance with the present invention as heretofore described. Thereby the detection precision of the image motion vector can be improved.

Further, when an image motion vector is detected from a video signal of an interlace system, the detection error of the inter-field image motion vector due to pixel displacement in vertical direction caused between fields by interlace is corrected by the vertical-direction correction circuit. Thereby the detection precision of the image motion vector can be improved.

Further, in case interpolation processing is applied to a conventional image fluctuation detection apparatus having a filter circuit for extracting an image feature from a video signal, the difference of the overall filter effect between the case where the interpolation calculation processing is performed and the case where the interpolation calculation processing is not performed is eliminated and the detection precision of the image motion vector can be further improved.

We claim:

1. An image fluctuation detection apparatus comprising:
   a vertical-direction interpolation circuit for performing interpolation processing between lines on an input video signal of interlace system to produce an interpolation signal and outputting the interpolation signal as a vertical-direction interpolation video signal;
   a representative point memory circuit for dividing said vertical-direction interpolation video signal into a plurality of areas, storing signals corresponding to representative points of respective areas as representative point signals, and outputting respective representative point signals of last field;
   a correlation calculation circuit for performing correlation calculations between respective representative point signals supplied from said representative point memory circuit and said input video signal within the respective areas corresponding to said respective representative point signals;
   a motion vector detection circuit for detecting an image motion vector from a calculation result supplied from said correlation calculation circuit; and
   a motion vector correction circuit for correcting the image motion vector supplied from said motion vector detection circuit.

2. An image fluctuation detection apparatus according to claim 1, wherein said image fluctuation detection apparatus comprises:
   a plurality of filter circuits annexed to said image fluctuation detection apparatus to extract an image feature from an input video signal;
   a filter selection circuit for selecting characteristics of said plurality of filter circuits;
   a vertical-direction interpolation circuit for performing interpolation processing between lines of a video signal outputted from said filter selection circuit to produce an interpolation signal and outputting the interpolation signal as a vertical-direction interpolation video signal; and
   a signal selection circuit for selecting either said vertical-direction interpolation video signal or the video signal outputted from said filter selection circuit,
   and wherein a product characteristic of a filter characteristic of at least one filter circuit included in said plurality of filter circuits multiplied by a filter characteristic of said vertical-direction interpolation circuit is equivalent to a filter characteristic of at least one different filter circuit included in said plurality of filter circuits, and said filter selection circuit and said signal selection circuit are commonly controlled by field information substantially at the same time.

3. An image fluctuation detection apparatus comprising:
   a vertical-direction interpolation circuit for performing interpolation processing between lines on an input video signal of interlace system to produce an interpolation signal and outputting the interpolation signal as a vertical-direction interpolation video signal;

a representative point memory circuit for dividing said input video signal into a plurality of areas, storing signals corresponding to representative points of respective areas as representative point signals, and outputting respective representative point signals of last field;

a correlation calculation circuit for performing correlation calculations between respective representative point signals supplied from said representative point memory circuit and said vertical-direction interpolation video signal within the respective areas corresponding to said respective representative point signals;

a motion vector detection circuit for detecting an image motion vector from a calculation result supplied from said correlation calculation circuit; and a motion vector correction circuit for correcting the image motion vector supplied from said motion vector detection circuit.

4. An image fluctuation detection apparatus according to claim 3, wherein said image fluctuation detection apparatus comprises:

a plurality of filter circuits annexed to said image fluctuation detection apparatus to extract an image feature from an input video signal;

a filter selection circuit for selecting characteristics of said plurality of filter circuits;

a vertical-direction interpolation circuit for performing interpolation processing between lines of a video signal outputted from said filter selection circuit to produce an interpolation signal and outputting the interpolation signal as a vertical-direction interpolation video signal; and a signal selection circuit for selecting either said vertical-direction interpolation video signal or the video signal outputted from said filter selection circuit, and wherein a product characteristic of a filter characteristic of at least one filter circuit included in said plurality of filter circuits multiplied by a filter characteristic of said vertical-direction interpolation circuit is equivalent to a filter characteristic of at least one different filter circuit included in said plurality of filter circuits, and said filter selection circuit and said signal selection circuit are commonly controlled by field information substantially at the same time.

5. An image fluctuation detection apparatus comprising:

a vertical-direction interpolation circuit for performing interpolation processing between lines on an input video signal of interlace system to produce an interpolation signal and outputting the interpolation signal as a vertical-direction interpolation video signal;

a signal selection circuit responsive to field information to select either said vertical-direction interpolation video signal or said input video signal;

a representative point memory circuit for dividing an output signal of said signal selection circuit into a plurality of areas, storing signals corresponding to representative points of respective areas as representative point signals, and outputting respective representative point signals of last field;

a correlation calculation circuit for performing correlation calculations between respective representative point signals supplied from said representative point memory circuit and an output video signal within the respective areas supplied from said signal selection circuit corresponding to said respective representative point signals;

a motion vector detection circuit for detecting an image motion vector from a calculation result supplied from said correlation calculation circuit.

6. An image fluctuation detection apparatus according to claim 5, wherein said image fluctuation detection apparatus comprises:

a plurality of filter circuits annexed to said image fluctuation detection apparatus to extract an image feature from an input video signal;

a filter selection circuit for selecting characteristics of said plurality of filter circuits;

a vertical-direction interpolation circuit for performing interpolation processing between lines of a video signal outputted from said filter selection circuit to produce an interpolation signal and outputting the interpolation signal as a vertical-direction interpolation video signal; and a signal selection circuit for selecting either said vertical-direction interpolation video signal or the video signal outputted from said filter selection circuit, and wherein a product characteristic of a filter characteristic of at least one filter circuit included in said plurality of filter circuits multiplied by a filter characteristic of said vertical-direction interpolation circuit is equivalent to a filter characteristic of at least one different filter circuit included in said plurality of filter circuits, and said filter selection circuit and said signal selection circuit are commonly controlled by field information substantially at the same time.

* * * * *